Aug. 23, 1966   M. KUTS ETAL   3,267,786
CUTTING DEVICE FOR A CONTINUOUSLY MOVING TUBE
Filed Aug. 5, 1964   6 Sheets-Sheet 1
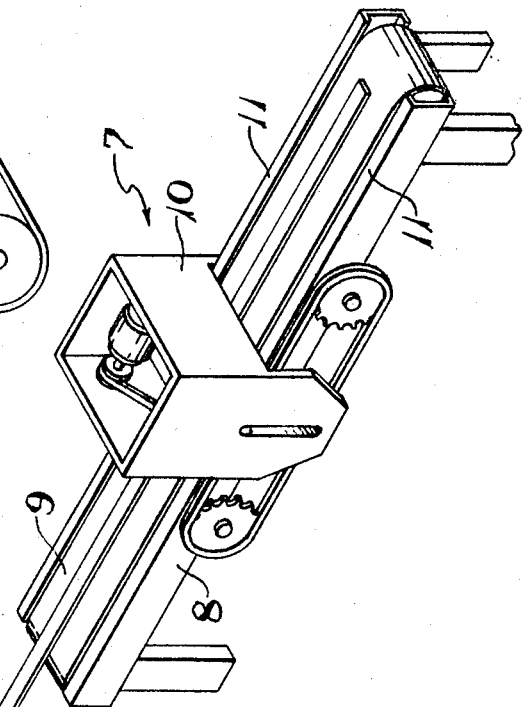
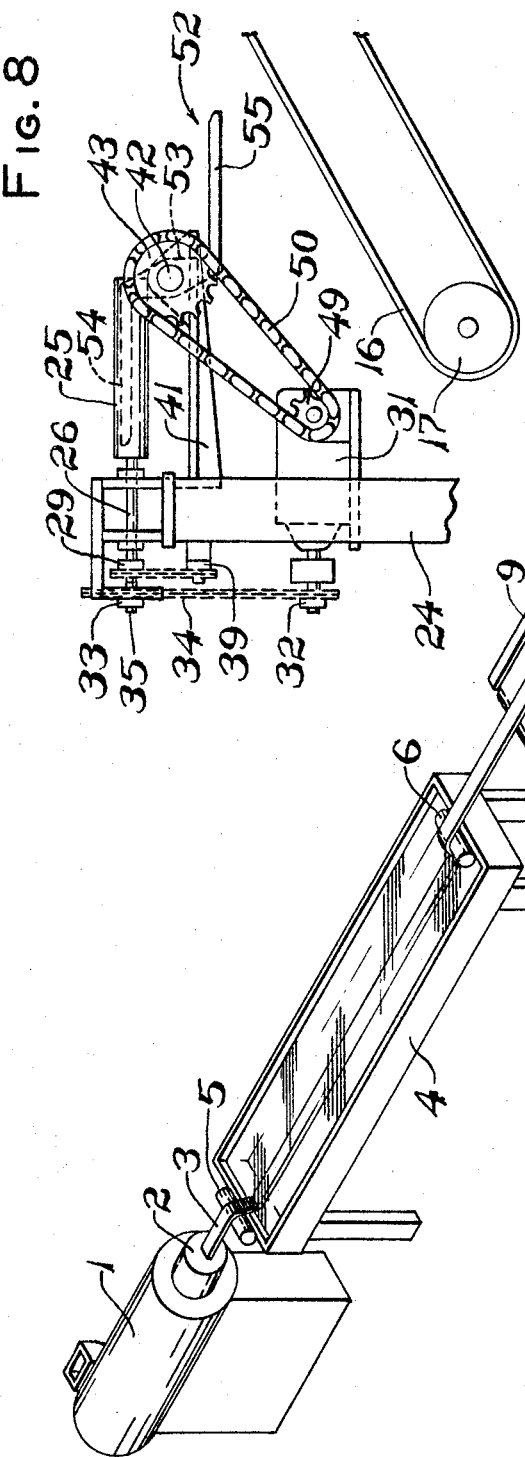
INVENTORS
MATHEW KUTS
BY RALPH F. COOPER
Joseph Januszkiewicz
ATTY.

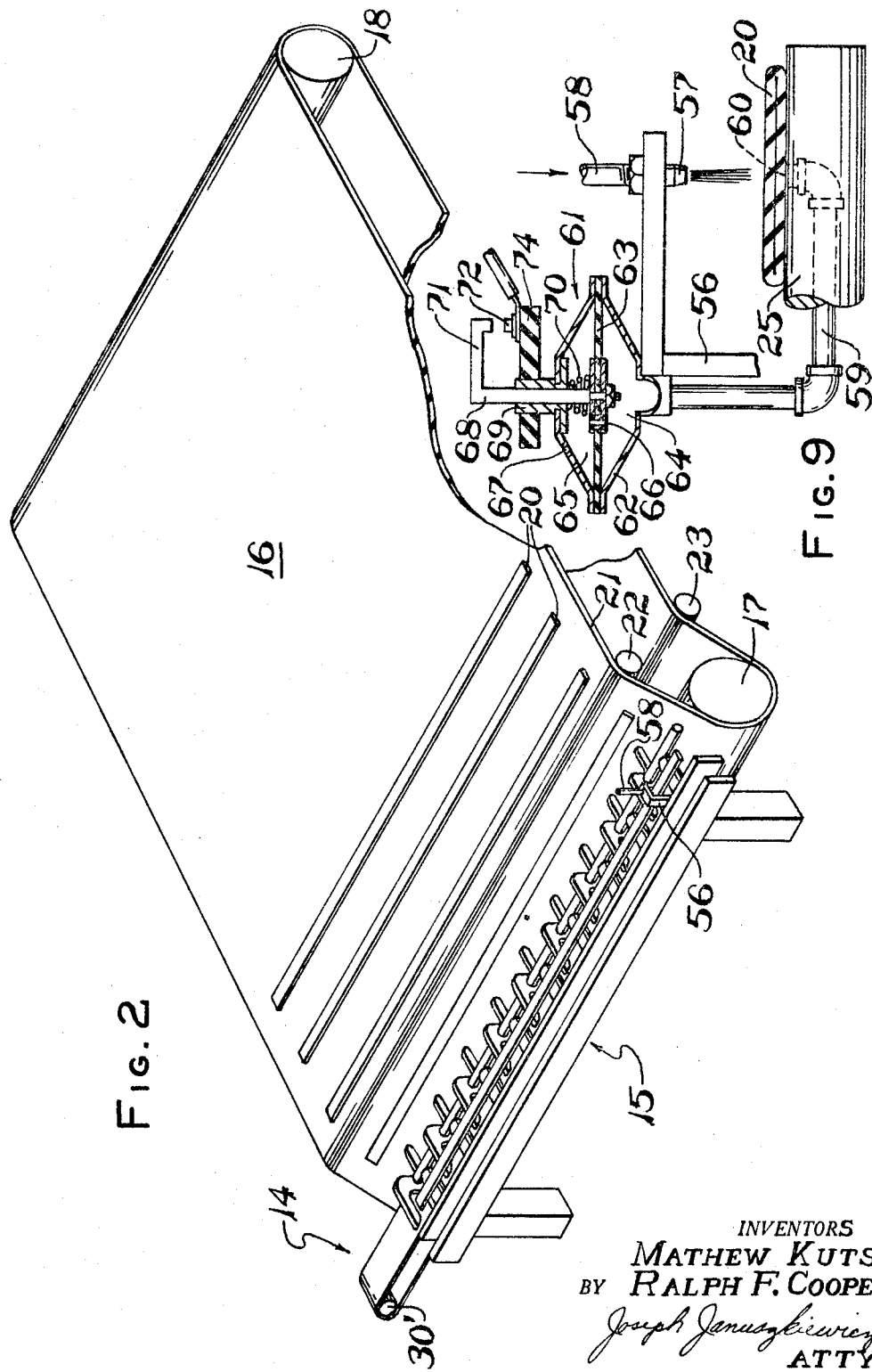

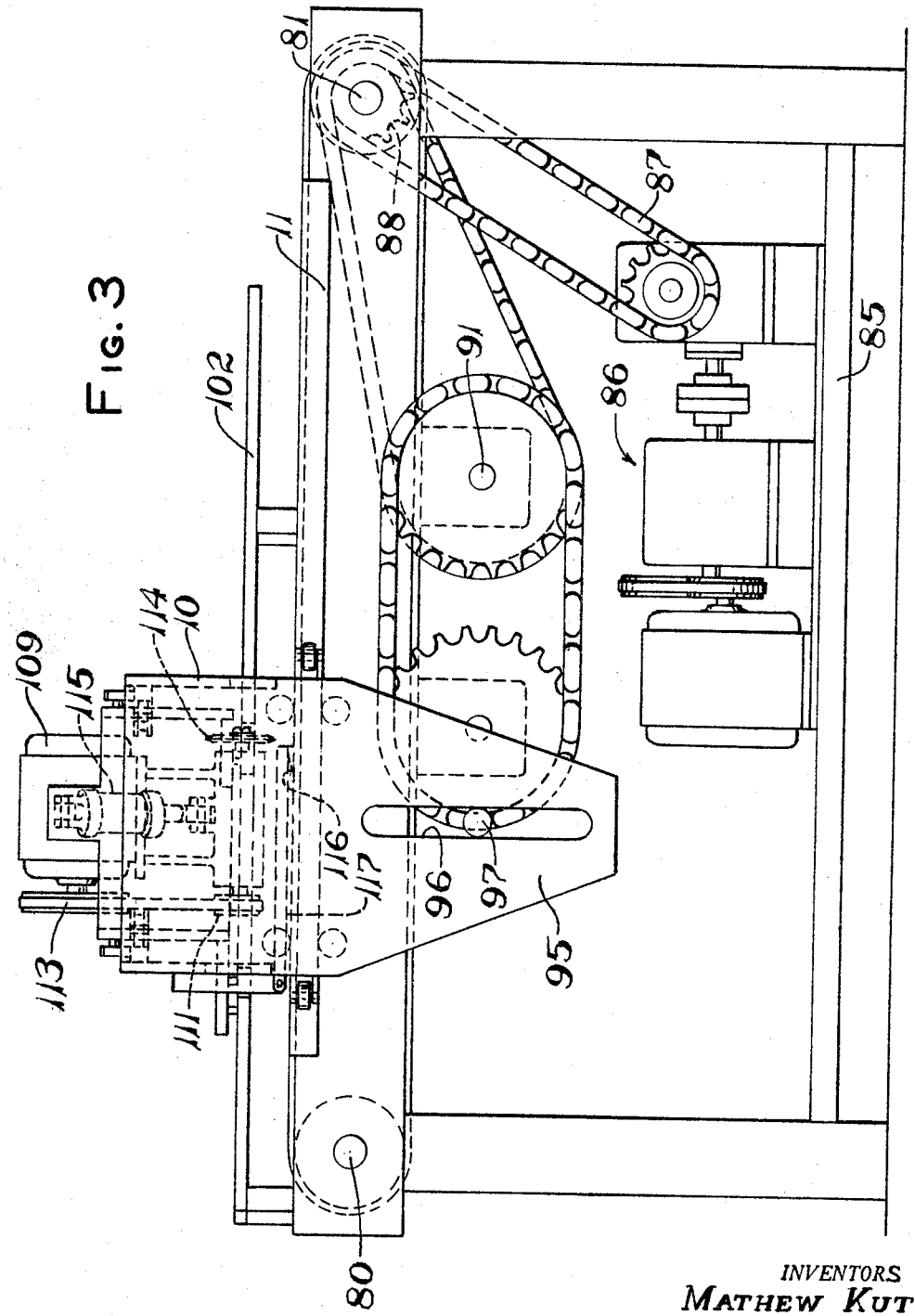

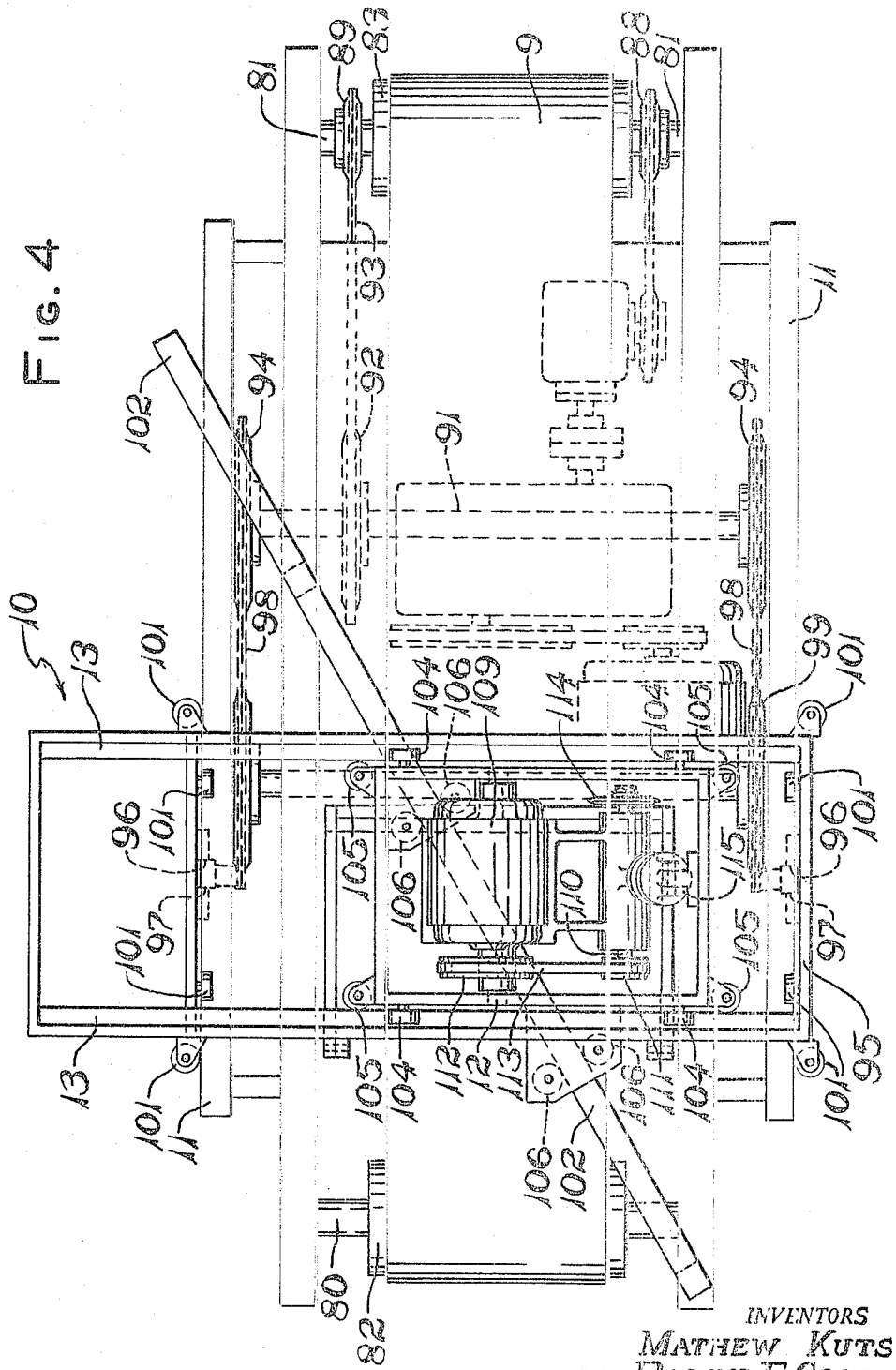

Aug. 23, 1966 M. KUTS ETAL 3,267,786
CUTTING DEVICE FOR A CONTINUOUSLY MOVING TUBE
Filed Aug. 5, 1964 6 Sheets-Sheet 5

INVENTORS
MATHEW KUTS
BY RALPH F. COOPER
ATTY.

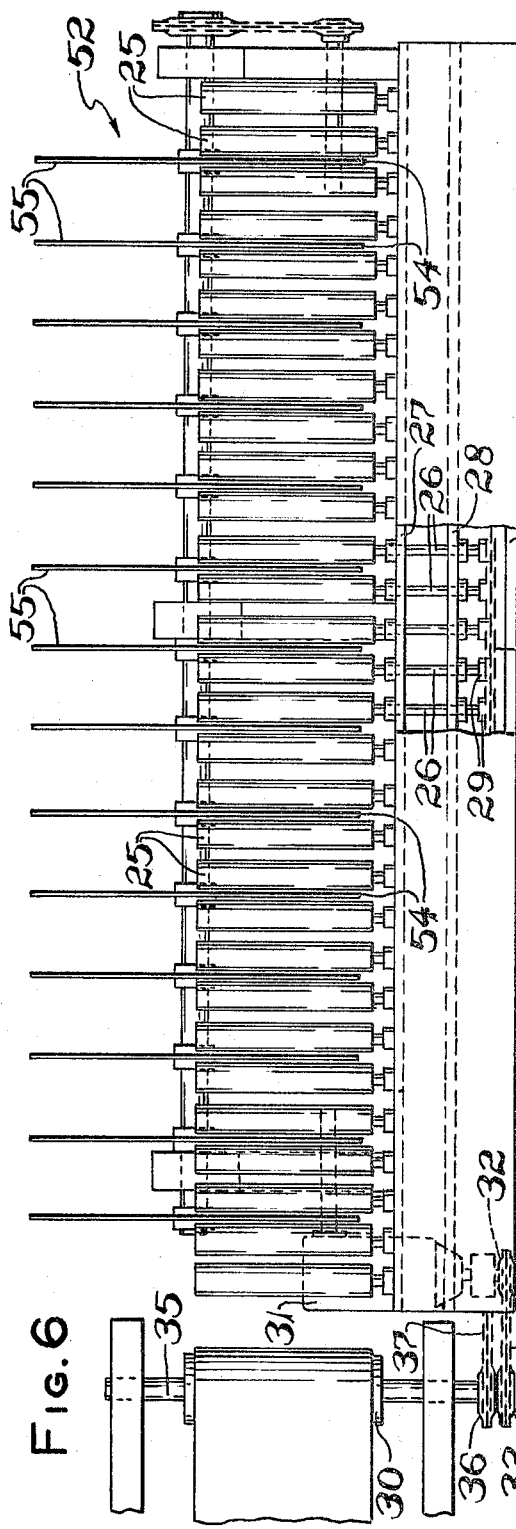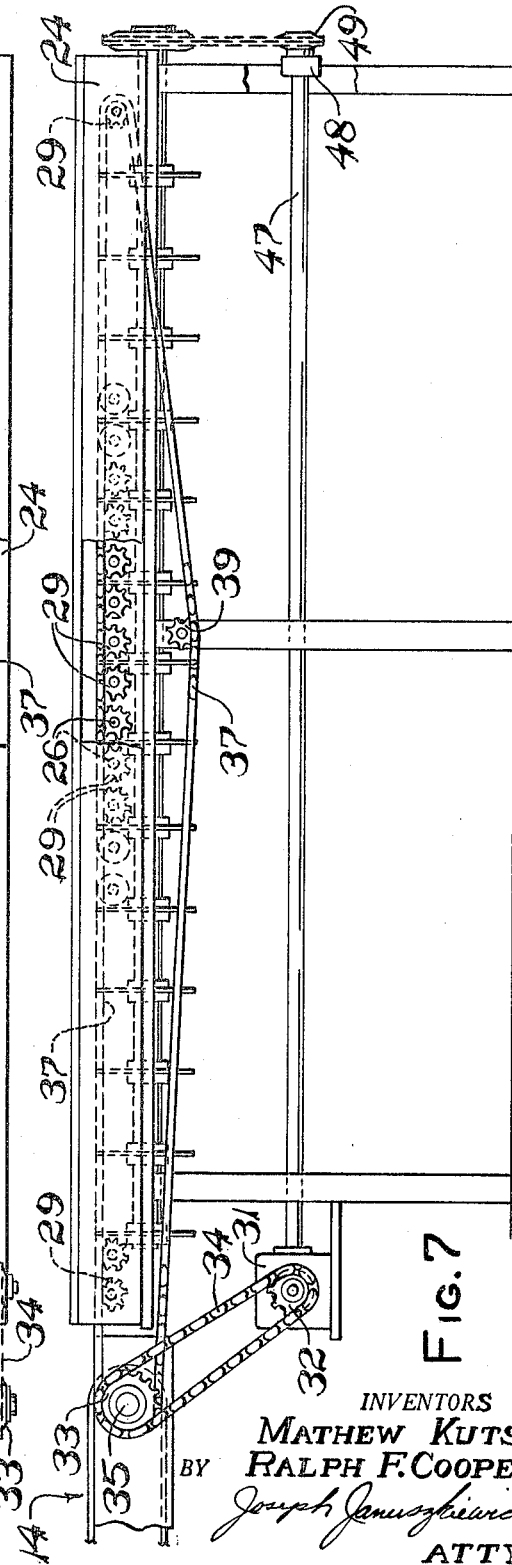

3,267,786
CUTTING DEVICE FOR A CONTINUOUSLY
MOVING TUBE
Mathew Kuts and Ralph F. Cooper, Akron, Ohio, assignors to The B. F. Goodrich Company, New York, N.Y., a corporation of New York
Filed Aug. 5, 1964, Ser. No. 387,686
3 Claims. (Cl. 83—318)

This invention relates to a cutting device for an axially moving workpiece and more particularly to a cutting device which cuts continuously moving extruded tube into predetermined length.

In the manufacture of rubber bands and like articles, a flat band of elastomeric material would be folded over along its running length, have its longitudinally extending free ends cut to align the edge, and thence have its aligned edges joined as by cementing them together and thence cut them into predetermined length as by shearing them. Thereafter such cut tube or band would have its ends opening up manually (because the shearing action would close them) to facilitate the insertion of rods therein.

The general purpose of this invention is to provide means for producing a rubber band or tube of consistently uniform length, and eliminating manual manipulation in the manufacture thereof. It is a further purpose of this invention to provide a cut tube having open undistorted end portions. The device comprises means for operating on extruded tube which is conveyed past cutting means, which cutting means has a carriage movable in the same direction and at the same speed as the conveyed tube. The cutting means has a transversely movable cutter which makes a transverse severing cut on the tube during such carriage travel and on the return movement of the carriage the cutter is retracted out of the way. The uniformly cut tubes or rubber bands are delivered with their cut ends conditioned for the receiving of a mandrel.

It is an object of this invention to provide a new and improved means for producing fixed length tubes or rubber bands.

A further object of this invention is to provide a novel means for cutting tubes of elastomeric material into rubber bands of predetermined length having a smooth transversely extending edge which is not crimped.

A further object of this invention is to cut a continuously formed tube of soft elastic material into segments of equal length wherein the transverse cut is normal to the longitudinal center line of the continuously moving tube and whose edge portion is of the same thickness as any other portion of the soft elastic material.

Other objects of the invention will be apparent to those skilled in the art to which our invention relates from the following description taken in connection with the accompanying drawings, wherein:

FIGS. 1 and 2 when lonigtudinally aligned are perspective views of the cutting device showing the extruder and discharge conveyor.

FIG. 3 is a front elevational view of the cutting device.

FIG. 4 is a plan view of the cutting device.

FIG. 6 is a plan view of the discharge conveyor.

FIG. 7 is a front elevational view of the discharge conveyor.

FIG. 8 is an enlarged side fragmentary view of the discharge conveyor.

FIG. 9 is an enlarged schematic view of the sensing means.

Figure 5:
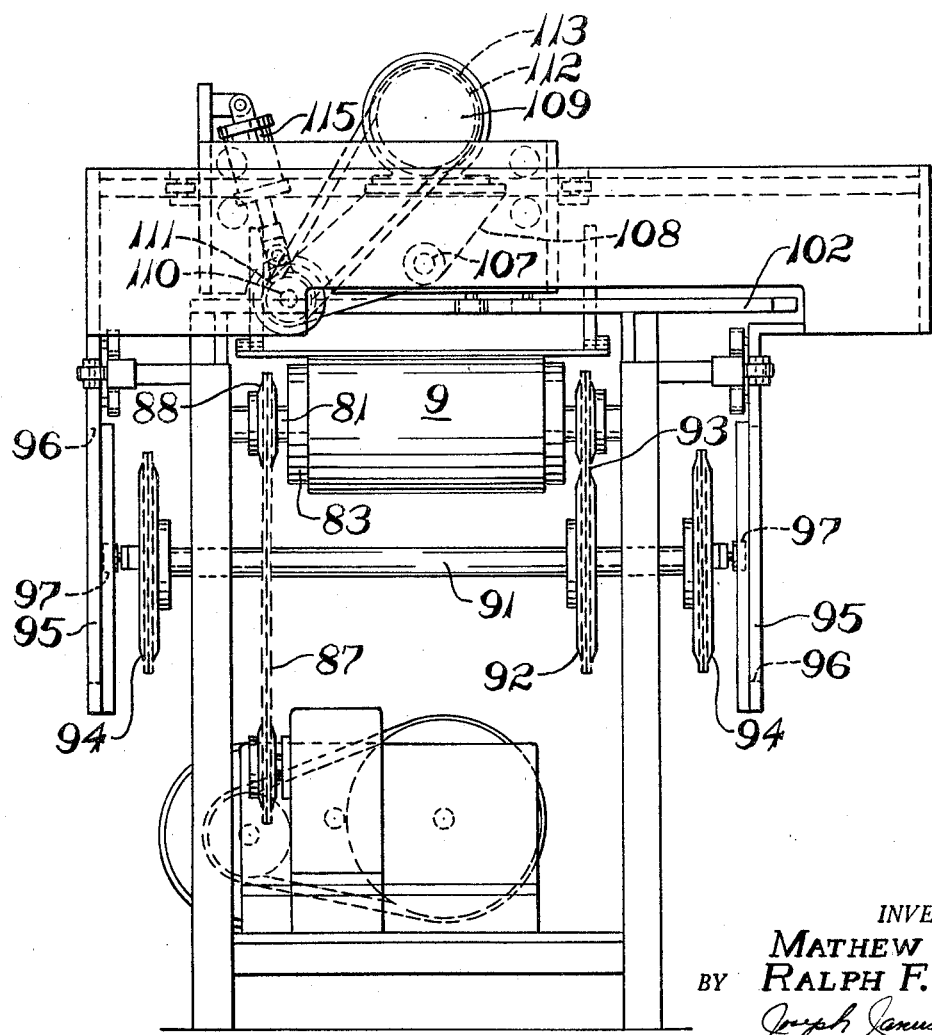
FIG. 5 is a side elevational view of the cutting device.

Referring to the drawings, the apparatus includes an extruder 1 which has a nozzle 2 from which issues a flat unvulcanized rubber tube 3. The tube 3 is conveyed to a cooling tank 4 as by roller 5. The tube is drawn through the cooling tank by a driven roller 6 in cooperation with the roller 5. Means are provided to maintain the temperature of the fluid in the tank 4 at a suitable level.

The cooled extruded tube 3 is thence conveyed to the cutting apparatus 7 which includes a support frame 8 having an endless conveyor belt 9 suitably driven and journaled thereon by means to be described. The cutting apparatus includes a carriage 10 reciprocably mounted on longitudinally extending ways 11 (FIGS. 3 and 4) and a cross slide 12 mounted on transversely extending ways 13 of carriage 10. The cut tubes are conveyed by the endless belt 9 to a transfer conveyor 14 for transfer to a discharge conveyor unit 15 which discharges the cut tubes onto an endless flat belt 16 for insertion of mandrels for further processing.

The endless flat belt 16 is trained about an idler pulley 17 and a driven pulley 18 such that the elongated cut tubes have their open ends 20 closely adjacent the lateral side edges 21 of the belt 16. A pair of spaced pulleys 22 and 23, having their axes parallel to pulleys 17 and 18, additionally support the flat belt 16 in its orbital run.

The discharge conveyor unit 15 comprises a frame 24 which rotatably supports a plurality of rollers 25 whose axes are generally parallel to the longitudinal center line or pass line of belt 16. Each roller 25 is journaled on a shaft 26, which shaft 26 is supported on one end by a pair of spaced rails 27, 28. The outermost end portion of each shaft 26 adjacent rail 28 has a spur gear 29 secured thereto. A drive motor unit 31 (FIGS. 7 and 8) is mounted on one end portion of frame 24. The motor unit 31 drives a sprocket 32 which in turn drives a sprocket 33 via a chain 34. Sprocket 33 is mounted on a shaft 35 to which is keyed another sprocket 36 whereby motor unit 31 drives sprockets 33 and 36. An endless chain 37 encircling the sprocket 36 and the spur gears 29 as well as an idler sprocket 39 drives such spur gears 29 and their corresponding rollers 25 to propel cut tubes thereon for discharge onto the discharge conveyor unit 15 as to be described.

A drive roll 30 (FIG. 6) is keyed to shaft 35 for rotation therewith. An idler roller 30' (FIG. 2) having its axis parallel to drive roll 18 cooperates therewith to support for orbital action an endless belt of transfer conveyor 14. Motor unit 31 drives the endless belt of transfer conveyor 14 and rollers 25 at a faster rate of speed than the belt 9 is driven to separate the cut tube from the tube being cut by the cutting apparatus 7 as to be described.

Frame 24 supports a pair of end spaced brackets 41 (FIG. 8) which brackets 41 pivotally support a shaft 42. A sprocket 43 is keyed to one end of shaft 42. Motor 31 through a right angle drive means not shown rotates shaft 47 (FIG. 7) which shaft 47 is connected to a solenoid operated clutch 48. The output of clutch 48 is connected to a sprocket 49 which via chain 50 drives sprocket 43. Solenoid operated clutch 48 is periodically energized in a manner to be described to impart a rotation to sprockets 49 and 43 from drive shaft 47 which action is substantially an indexing action to the shaft 42 and the sprocket 43. Shaft 42 supports a plurality of transfer means 52 which comprises a plate member 53 keyed or otherwise secured to shaft 42, with each plate member 53 having horizontally disposed arm portions 54 and 55 at the respective end portions thereof. As seen in FIG. 8, the horizontally disposed arm portion 54 is closely adjacent the upper tangential line of rollers 25 such that indexing of sprocket 43 by momentarily energizing solenoid clutch 48 operates to swing the arm portions 54 clockwise as seen in FIG. 8 to lift and pivot a cut tube from the rollers 25 and transfer such cut tube onto flat belt 16 while simultaneously pivoting arm portion 55 clockwise into the position formerly held by arm portion 54. Such swinging movement of arms 54 and 55 is 180 degrees with each indexing action of sprocket 43.

The sensing means for operating solenoid clutch 48 is shown in FIG. 9 wherein bracket 56 secured to one end of frame 24 supports a vertically extending nozzle 57 that is connected to an air supply line 58. Nozzle 57 is directed downwardly toward the rollers 25 to direct pressurized air to a conduit 59 having a receiving orifice 60. The orifice 60 is in vertical alignment with the nozzle 57 to receive pressurized air therefrom. As seen in FIG. 9 the cut tube covers the orifice 60 and blocks the air passage from nozzle 57 to conduit 59. Bracket 56 additionally supports a pressure responsive control switch 61 which is connected to conduit 59. Control switch 61 comprises a two-part housing 62 containing a flexible diaphragm 63 which cooperates with such housing 62 to define a pair of spaced chambers 64 and 65. Chambers 64 and 65 are connected to each other via a throttle valve 66. Chamber 65 is vented to the atmosphere via port 67 whereas chamber 64 is connected to conduit 59 and via opening 60 and nozzle 57 to the air pressure from conduit 58 except as the air flow is interrupted by the passage of the cut tube on rollers 25 between the nozzle 57 and the opening 60. An upwardly extending switch contact rod 68 is connected to diaphragm 63 for reciprocable guided movement through a guide block 69 mounted on the housing 62. A spring 70 encompassing rod 68 has its one end seated on the upper end of the guide block 69 and its other end seated on the diaphragm 63 to bias such contact rod downwardly. The upper end portion of rod 68 has an outwardly extending arm portion 71 that is adapted to contact an electrical contact 72. Electrical contact 72 is supported by an insulating block 74. The contact 72 is spaced in vertical alignment immediately below the outwardly extending arm portion 71 of contact rod 68, providing a normally open switch in a circuit having one side grounded to the machine. When chamber 64 is pressurized, the outermost end portion of rod 68 is maintained out of contact with electrical contact 72 but when chamber 64 is cut off from the pressure source, spring 70 biases diaphragm 63 downwardly along with rod 68 to thereby make contact with switch 72 which in turn energizes clutch 48 to thereby impart rotation to shaft 47. Rotation of shaft 47 imparts rotation to sprocket 49 which in turn rotates sprocket 43 to swing the arm portions 54 clockwise as viewed in FIG. 8, which action transfers the cut tube from the rollers 25 to the flat belt 16. Movement of the tube from the rollers 25 permits the flow of pressurized air from the conduit 58 and nozzle 57 to the conduit 59 which directs pressurized fluid to chamber 64. Pressurization of chamber 64 operates to move diaphragm 63 upwardly along with the rod 68 to break the contact with electrical contact 72 and thereby de-energize clutch 48. The circuit is so arranged to effect a 180 degree indexing of the transfer means 52, which action operates to transfer cut tubes from the rollers 25 of discharge conveyor unit 15.

Support frame 8 of cutting apparatus 7 rotatably supports a pair of shafts 80, 81 at the respective end portions thereof. Shaft 80 supports an idler roller 82 whereas shaft 81 supports a driven roller 83. Endless conveyor belt 9 is trained about the rollers 83 and 84 for delivering the extruded tube from the cooling tank 4 to the cutting apparatus 7 and from such cutting apparatus 7 to the transfer conveyor 14. Idler rollers not shown are suitably journaled on frame 8 to additionally support the movement of the belt 9 and prevent sagging thereof.

Support frame 8 has a lower support 85 (FIG. 3) which supports a motor and speed reducer unit 86 having an output which is connected to an endless chain 87. The chain 87 is trained about sprocket 88 that is keyed to one end of shaft 81. The other end of shaft 81 has a sprocket 89 (FIGS. 4 and 5) keyed thereto. The output of sprocket 89 is adapted to drive a shaft 91 journaled on the frame 8. Shaft 91 supports for rotation therewith a sprocket 92 which receives its power from sprocket 89 via chain connection 93. The respective outer ends of shaft 91 support for rotation therewith sprockets 94.

Carriage 10 mounted for reciprocable movement on ways 11 of frame 8 includes a pair of spaced downwardly extending plates 95 suitably secured thereto. The plates 95 are identical in construction and accordingly only one will be described. Plate 95 has a vertically extending cam slot 96 in which is journaled for reciprocable movement a cam follower 97. Cam follower 97 is connected to an endless chain 98 that is trained about driven sprocket 94 and idler sprocket 99. Rotation of endless chain 98 reciprocates carriage 10. Carriage 10 is guided in its movement on ways 10 by a plurality of rollers 101 connected thereto.

The upper side edge portions of support frame 8 have adjustably mounted thereon a cam bar 102 that extends transversely across such frame 8. Cam bar 102 is angularly disposed relative to the longitudinal center line of conveyor belt 9. The transversely extending ways 13 on carriage 10 are normal to the ways 11. Cross slide 12 has horizontally disposed rollers 104 and 105 which engage the ways 13 for guiding the transverse movement of such cross slide 12 on carriage 10. Cross slide 12 has a downwardly extending pair of rollers 106 which engage the cam bar 102 to impart a transverse movement to the cross slide 12 as the carriage 10 reciprocates on ways 11.

Cross slide 12 has a shaft 107 journaled thereon, with the axis of such shaft 107 lying parallel to the longitudinal center line of belt 9. Pivotally supported on shaft 107 by support means 108 is a motor unit 109. Support means 108 additionally supports a shaft 110, which shaft 110 has its axis parallel to shaft 107. One end of shaft 110 supports a pulley 111 (FIG. 4) which is in alignment with a pulley 112 driven by motor unit 109. A V-belt 113 trained about pulleys 111 and 112 imparts rotation to shaft 110 from motor unit 109. The other end of shaft 110 supports a cutting disc 114. One end of cross slide 12 pivotally supports the cylinder end of a hydraulic jack 115 with the rod end thereof connected to the support means 108 adjacent shaft 110. Pressurization of the rod end of hydraulic jack 115 pivots the cutting disc 114 clockwise about shaft 107 (as viewed in FIG. 5) whereas pressurization of the head end of hydraulic jack 115 pivots the cutting disc counterclockwise about shaft 107 (as viewed in FIG. 5) into cutting relationship with the extruder tube being conveyed on conveyor belt 9. To facilitate the cutting of a tube on belt 9, a transversely extending guide bracket 116 (FIG. 3) is connected to the carriage 10 as by braces 117 whereby the extruded tube conveyed along belt 9 passes over an inclined edge of guide bracket 116 and back onto belt 9. Such action permits the cutting of the tube by the cutting disc 114 without damage to the belt 9.

OPERATION

In the operation of the apparatus described, an unvulcanized rubber tube 3 is extruded from the extruder 1. Such tube 3 is then guided into and through the cooling tank 4 by rollers 5 and 6. Conveyor belt 9 then receives the extruded tube and conveys such tube to the cutting apparatus 7. The tube is guided by the conveyor belt 9 over the inclined edge of guide bracket 116 (to facilitate cutting) and back over onto the conveyor belt 9. As the carriage 10 is moved leftward as viewed in FIGS. 1 and 3, the guide bracket 116 rides under the extruded tube while the tube is being propelled by the belt 9. Carriage 10 is reciprocated along ways 11 by the movement imparted by cam follower 97 engaging the guide slot 96 in plate 95 fixed to carriage 10. The chain 98 is driven at the same speed as the conveyor belt 9 to thereby move the carriage 10 in synchronism with the movement of the tube. Carriage 10 is then moved rightward as viewed in FIG. 3, while simultaneously therewith the head end of hydraulic cylinder 115 is pressurized to move the rotating cutting disc 114 into cutting engagement with the tube 3. Guide bracket 116 supports the tube 3 closely adjacent the cut being made to insure a clean cut. Cutting disc 114 is rotated by motor unit 108 as described above, while the cut is being made to insure an undistorted cut edge. As carriage 10 is moved further rightward as viewed in FIGS. 3 and 4, cross slide 12, which supports disc 114, is moved transversely across the longitudinal belt 9 by the engagement of rollers 106 (fixed to the cross slide 12) with the cam bar 102.

A complete transverse cut is made on the tube 3 by the cutting disc 114 by the time carriage 10 reaches the end of its rightward-most travel. At such time a limit switch, not shown, is actuated by the lateral travel of cross slide 12 whereby a solenoid valve is actuated to direct pressurization fluid to the rod end of hydraulic piston 115 which raises the cutting disc 114 away from the tube 3, pivoting disc 114, support means 108, and motor unit 109 clockwise as seen in FIG. 5 about shaft 107. During the return or leftward movement of carriage 10 as viewed in FIG. 5, the cross slide 12 is cammed forwardly by cam bar 102 toward its initial cutting position. Upon completion of the return or leftward movement of carriage 10, cross slide 12 actuates a limit switch which deactuates the solenoid valve which directs pressurized fluid to the head end of hydraulic piston 115 to lower the cutting disc into engagement with the tube for beginning the transverse cut. The transverse cut is made while the tube is moving, however, since carriage 10 and cross slide 12 are moving in a longitudinal direction at the same speed as the conveyor belt 9, there is only transverse relative movement between the cross slide 12 and the tube 3 carried by belt 9.

The cut tube 3 is conveyed by the conveyor belt 9 to the transfer conveyor unit 14 (which is traveling at a faster linear speed than belt 9) which thereby accelerates the longitudinal movement of the cut tube relative to the tube remaining on the conveyor belt 9. As an example of this, assuming belt 9 is traveling at approximately 100 feet per minute and the belt of conveyor unit 14 traveling at approximately 115 feet per minute, the cut tube is accelerated sufficiently to permit such separation therebetween to permit lateral tarnsfer without interruption. Conveyor unit 14 transfers the cut tube onto driven rollers 25 which move the cut tube in a longitudinal direction at the same speed as conveyor unit 14. When the forwardly-most end portion of the cut tube covers the receiving orifice 60, the pressurized air input into conduit 59 is interrupted causing a reduction in pressure chamber 64 of pressure responsive switch 61 whereby spring 70 moves diaphragm 63 along with contact rod 68 downwardly until the outer end portion of rod 68 makes contact with electrical contact 72 to energize solenoid operated clutch 48. Energization of clutch 48 operates to impart a rotation to sprocket 49 which transfers rotation to sprocket 43 via chain 50. Rotation of sprocket 43 imparts a clockwise rotation to the transfer means 52 as viewed in FIG. 8 whereby simultaneous arm portions 54 transfer the cut tube 3 onto flat belt 16. The cut tubes 3 on belt 16 are aligned to facilitate the insertion of mandrels into such tubes for further processing. The movement of the cut tube 3 away from the receiving orifice 60 permits the passage of pressurized air to the conduit 59 and the pressure responsive control switch 61 to move contact rod 68 upwardly to break contact between electrical contact 72 and the outwardly extending arm portion 71 which de-energizes clutch 48 and stops the rotation of the transfer means 52 as more fully described above.

Obviously many modifications and variations of the present invention are possible in the light of the above teachings. It is therefore to be understood that within the scope of the appended claims the invention may be practiced otherwise than as specifically described.

We claim:

1. A machine for cutting a longitudinally extruded tube into successive segments comprising: a frame having longitudinally extending ways thereon; a continuous belt mounted on said frame having a conveying run and a return run; said runs movable in a direction parallel to said ways; motive means operatively connected to said belt for continuously moving said conveying run in a direction and speed corresponding to that of such extruded tube; a carriage mounted on said ways, said motive means being connected to said carriage for moving said carriage on said ways in a first direction parallel to and at the same speed as said conveying run; and said motive means including means for moving said carriage in a second direction opposite to said first direction; a cam bar adjustably mounted on said frame having a longitudinally extending guiding means angularly disposed relative to said ways; said carriage having guideways extending in a direction normal to said ways; a cross slide mounted on said carriage and movable rectilinearly on said guideways; means operatively connecting said cross slide to said cam bar for moving said cross slide laterally relative to said longitudinally movable carriage; cutting means mounted on said cross slide; and means operatively connected to said cutting means for pivoting said cutting means into and out of cutting position.

2. An apparatus for cutting a continuously fed oblong workpiece, comprising: a frame having spaced ways thereon, said ways extending in a longitudinal direction; an endless conveyor belt mounted on said frame and orbiting thereon in a direction parallel to said ways, said conveyor belt having a conveying run and a return run, means for moving said belt at a preselected speed, a carriage mounted on said frame for reciprocable movement on said ways, means for moving said carriage in the direction of said conveying run at the same speed as said conveying run and independently of said conveying means, said means for moving said carriage including means for moving said carriage in the direction of said return run, said carriage having a laterally extending guide operative adjacent said conveying run for movement closely adjacent thereto, said carriage having guideways extending at right angles relative to said ways, a cross slide mounted on said carriage for reciprocable movement on said guideways, a cam bar on said frame operatively connected to said cross slide for moving said cross slide laterally on said guideways, cutting means pivotably mounted on said cross slide, and means on said cross slide operatively connected to said cutting means for pivoting said cutting means into closely adjacent relationship to said laterally extending guide on said carriage for making a laterally extending cut on a workpiece supported by said guide as said cross slide moves laterally on said guideways.

3. An apparatus for cutting a continuously fed flat extruded tube made of elastomeric material, comprising: an endless conveyor having a longitudinal center line; means for driving said conveyor to move one run thereof continuously in one direction; a carriage unit spanning said conveyor and mounted for reciprocation substantially in the line of movement of said conveyor and parallel to said longitudinal center line; said carriage having guide means movable therewith in contact with said one run whereby such flat tube travels over said guide means onto said one run as said carriage moves in a direction opposite to said one direction of said one run; motive means operatively connected to said carriage and said conveyor for moving said carriage in synchronism with said one run for a portion of said reciprocation of said carriage whereby said one run and said carriage move in said one direction; a cross slide mounted on said carriage; cutting means mounted on said cross slide; means for rotating the cutting blade of said cutting means; means selectively operable to pivot said cutting means relative to said cross slide into cooperative relationship with said guide means on said carriage to cut a flat tube supported by said guide means; and means operatively connected to said cross slide and cooperative therewith to move said cross slide transversely across said carriage whereby said cutting blade of said cutting means is adapted to make a cut across such flat tube whose cut edge is normal to said longitudinal center line.

References Cited by the Examiner

UNITED STATES PATENTS

| | | |
|---|---|---|
| 556,857 | 3/1896 | Madden. |
| 2,024,513 | 12/1935 | Diescher _____ 198—25 |
| 2,125,001 | 7/1938 | Cowen et al. _____ 264—150 |
| 2,454,194 | 11/1948 | Maynard _____ 264—150 |
| 2,596,630 | 5/1952 | Weyant _____ 83—318 X |
| 2,696,884 | 12/1954 | Mishler et al. _____ 83—318 |
| 3,089,372 | 5/1963 | Pilliner _____ 83—318 |
| 3,133,481 | 5/1964 | McCormick et al. __ 192—128 X |

ANDREW R. JUHASZ, *Primary Examiner.*